(12) United States Patent
Sun

(10) Patent No.: US 12,105,516 B2
(45) Date of Patent: Oct. 1, 2024

(54) SELF-MOVING DEVICE AND DISTANCE MEASURING METHOD THEREOF

(71) Applicant: DREAME INNOVATION TECHNOLOGY (SUZHOU) CO., LTD., Suzhou (CN)

(72) Inventor: Jiajia Sun, Suzhou (CN)

(73) Assignee: DREAME INNOVATION TECHNOLOGY (SUZHOU) CO., LTD., Suzhou (CN)

( * ) Notice: Subject to any disclaimer, the term of this patent is extended or adjusted under 35 U.S.C. 154(b) by 289 days.

(21) Appl. No.: 17/773,010

(22) PCT Filed: Nov. 28, 2020

(86) PCT No.: PCT/CN2020/132523
§ 371 (c)(1),
(2) Date: Apr. 28, 2022

(87) PCT Pub. No.: WO2021/147511
PCT Pub. Date: Jul. 29, 2021

(65) Prior Publication Data
US 2022/0390956 A1    Dec. 8, 2022

(30) Foreign Application Priority Data

Jan. 21, 2020  (CN) .......................... 202010069251.0

(51) Int. Cl.
*G05D 1/00*     (2024.01)
*G01S 17/08*    (2006.01)

(52) U.S. Cl.
CPC ............ *G05D 1/0238* (2013.01); *G01S 17/08* (2013.01)

(58) Field of Classification Search
CPC ............................. G05D 1/0238; G01S 17/08
See application file for complete search history.

(56) References Cited

U.S. PATENT DOCUMENTS

| 4,659,922 A | 4/1987 | Duncan |
| 2014/0088761 A1 | 3/2014 | Shamlian et al. |

FOREIGN PATENT DOCUMENTS

| CN | 1588126 A | 3/2005 |
| CN | 102645654 A | 8/2012 |
| CN | 103941307 A | 7/2014 |
| CN | 103941734 A | 7/2014 |
| CN | 103941735 A | 7/2014 |
| CN | 104245244 A | 12/2014 |
| CN | 105223951 A | 1/2016 |
| CN | 105404298 A | 3/2016 |
| CN | 107045352 A | 8/2017 |
| CN | 207020534 U | 2/2018 |
| CN | 108983246 A | 12/2018 |
| CN | 109460024 A | 3/2019 |
| CN | 209409782 U | 9/2019 |

(Continued)

*Primary Examiner* — Michael D Lang

(57) ABSTRACT

A self-moving device includes a body, a walking assembly arranged on the body, and a control system arranged in the body. The self-moving device further includes an optical receiving device and at least two optical emitting devices arranged on the body. Paths of emitted light emitted by the at least two optical emitting devices are different. The optical receiving device is adapted to receive a reflected light formed after the emitted light emitted by at least one of the optical emitting devices hits an obstacle. A distance measuring method of the self-moving device is also disclosed.

12 Claims, 3 Drawing Sheets

(56) References Cited

FOREIGN PATENT DOCUMENTS

| | | | |
|---|---|---|---|
| CN | 111240336 | A | 6/2020 |
| JP | 3301436 | B1 | 7/2002 |
| JP | 2015-517162 | A | 6/2015 |
| KR | 10-2009-0019480 | A | 2/2009 |
| RU | 2710453 | C1 | 12/2019 |

SELF-MOVING DEVICE AND DISTANCE MEASURING METHOD THEREOF

CROSS REFERENCE TO RELATED APPLICATIONS

The present application is a 35 U.S.C. § 371 National Phase conversion of International (PCT) Patent Application No. PCT/CN2020/132523, filed on Nov. 28, 2020, which claims benefit of a Chinese Patent Application No. 202010069251.0, filed on Jan. 21, 2020, the disclosure of which is incorporated by reference herein. The PCT International Patent Application was filed and published in Chinese.

TECHNICAL FIELD

The present application relates to a self-moving device and a distance measuring method thereof.

BACKGROUND

Self-moving devices, such as sweepers, cannot detect a distance information of obstacles with low reflectivity (such as black obstacles, etc.), so the self-moving devices cannot bypass such obstacles, and collisions will occur.

At present, a distance measuring sensor of the sweeper has a single structure and simple function, which can only achieve detours for obstacles with high reflectivity, but will hit obstacles with low reflectivity, thereby seriously affecting the user experience. For laser sensors with high distance measuring accuracy, the cost is high and it is not easy to popularize.

SUMMARY

An object of the present application is to provide a self-moving device and a distance measuring method thereof.

To achieve the above object, the present application provides the following technical solutions:

In a first aspect, a self-moving device is provided. The self-moving device includes a body, a walking assembly arranged on the body, and a control system arranged in the body. The self-moving device further includes an optical receiving device and at least two optical emitting devices arranged on the body. Paths of emitted light emitted by the at least two optical emitting devices are different. The optical receiving device is adapted to receive a reflected light formed after the emitted light emitted by at least one of the optical emitting devices hits an obstacle.

Further, the emitted light emitted by each of the optical emitting devices forms an included angle θ with a center line of the optical receiving device, and the included angle is greater than 0°.

Further, the optical emitting device farther from the optical receiving device in two adjacent optical emitting devices forms a first included angle with the center line of the optical receiving device; the optical emitting device closer to the optical receiving device forms a second included angle with the center line of the optical receiving device; and the first included angle is smaller than the second included angle.

Further, the at least two optical emitting devices are arranged on a same side of the optical receiving device.

Further, directions of the emitted light emitted by the at least two optical emitting devices are deviated toward the center line of the optical receiving device.

Further, the at least two optical emitting devices and the optical receiving device are arranged in a row.

Further, a detection range of the optical receiving device and the optical emitting device is within 2 cm.

Further, the at least two optical emitting devices and the optical receiving device are integrated in one optical module.

In a second aspect, a distance measuring method of a self-moving device is provided. The distance measuring method includes:
  at least two optical emitting devices emitting light with different paths; and
  an optical receiving device at least receiving at least one reflected light formed after an emitted light emitted by the optical emitting device hits an obstacle.

Further, the emitted light emitted by each of the optical emitting devices forms an included angle θ with a center line of the optical receiving device, and the included angle is greater than 0°.

The beneficial effects of the self-moving device and the distance measuring method thereof of the present application are: by adopting the emitted light that can emit different paths, the area of the emitted light received is larger when it is closer to the obstacle. The emitted light is superimposed by specular reflection and diffuse reflection, thereby increasing the received light intensity and reducing the problem of inconsistent feedback distances of obstacles with different reflectivity, so that obstacles with low reflectivity can be effectively detected, and detours to the obstacles with low reflectivity can be realized.

The above description is only an overview of the technical solutions of the present application. In order to understand the technical solutions of the present application more clearly and implement them in accordance with the contents of the description, preferred embodiments of the present application and the accompanying drawings are described in detail below.

DETAILED DESCRIPTION

The specific implementations of the present application will be described in further detail below with reference to the accompanying drawings and embodiments. The following examples are used to illustrate the present application, but are not intended to limit the scope of the present application.

Firstly, some terms involved in the present application are introduced:

A self-moving device can be, for example, a sweeping robot, a mopping robot, a dust-removing robot, an obstacle-removing robot, a lawn-mowing robot, a drawing robot, and the like. In some embodiments, in implementation, the self-moving device may be provided with a path planning system. The self-moving device moves according to the path set by the system, and performs operations such as cleaning, dust removal, wiping, and drawing. The self-moving device is further provided with a distance measuring unit, which is used to measure the distance between the self-moving device and the obstacle. The self-moving device will inevitably collide with obstacles during the working process. The self-moving device may also be provided with a wireless communication module such as a WIFI module and a Bluetooth module, so as to be connected in communication with intelligent terminals, and receive operation instructions transmitted by the user using the intelligent terminals through the wireless communication module.

An optical receiving device, such as an infrared receiver, is used to receive optical signals.

An optical emitting device, such as an infrared transmitter, is used to emit optical signals.

The self-moving device in the present application is a sweeping robot as an example. The distance measuring method of the present application is used to sense the existence of obstacles in the process of walking of the self-moving device. The distance measuring method can also be used in other self-moving devices that can realize self-moving control, while the application of the self-moving device is not specifically limited.

Figure 1:
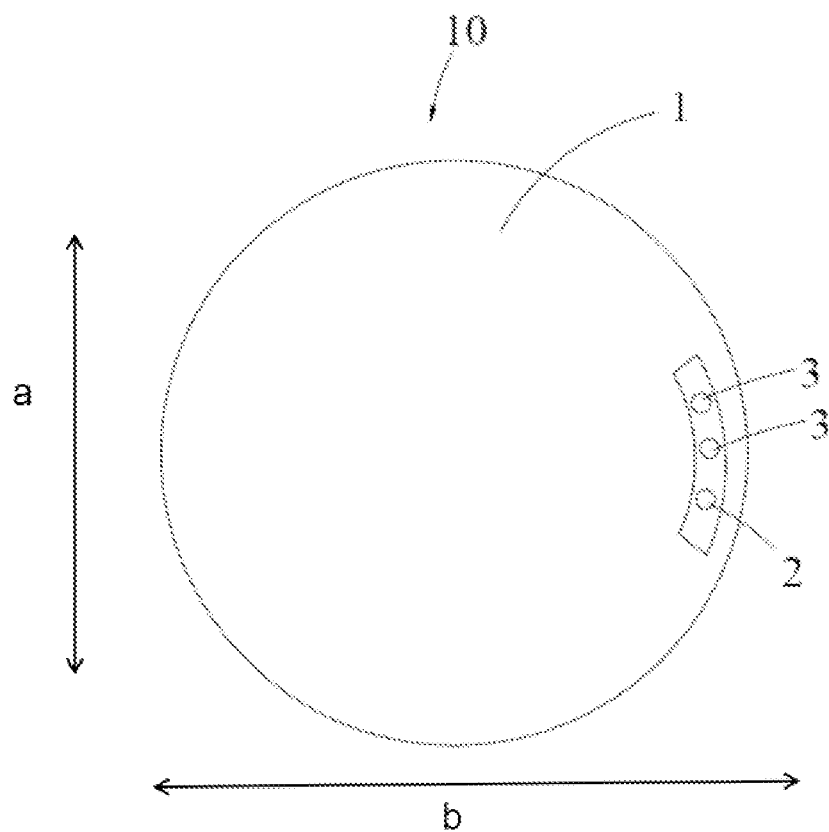
FIG. 1 is a schematic structural view of a self-moving device according to an embodiment of the application.

Referring to FIG. 1, the sweeping robot 10 provided in the embodiment of the present application includes a body 1, a walking assembly (not shown) disposed on the body 1, a control system (not shown) disposed in the body 1, an optical receiving device 2 and at least two optical emitting devices 3 arranged on the body 1. Paths of emitted light emitted by the at least two optical emitting devices 3 are different. The optical receiving device 2 can receive at least one reflected light formed after the emitted light emitted by the optical emitting device 3 hits an obstacle. In this embodiment, the optical receiving device 2 and the optical emitting device 3 are arranged on an upper surface of the body. The control system is signal-connected with the optical receiving device 2 and the optical emitting device 3. The control system controls the optical emitting device 3 to emit emission light (light emission signal). The optical receiving device 2 receives the emitted light (light receiving signal) and converts the emitted light into a light receiving signal and transmits it to the control system. The distance between the sweeping robot 10 and the obstacle is obtained by analysis and calculation by the control system, and then the sweeping robot is controlled by the control system to perform preset actions. Of course, in other embodiments, after receiving the emitted light, the optical receiving device 2 can also independently analyze and calculate the distance between the sweeping robot and the obstacle, and then transmit the result to the control system.

Alternatively, the emitted light emitted by each optical emitting device 3 forms an included angle θ with a center line of the optical receiving device 2, and the included angle is greater than 0°.

Alternatively, the optical emitting device 3 farther from the optical receiving device 2 among the two adjacent optical emitting devices 3 forms a first included angle with the center line of the optical receiving device 2. The optical emitting device 3 which is closer to the optical receiving device forms a second included angle with the center line of the optical receiving device 2. The first included angle is smaller than the second included angle.

Alternatively, at least two optical emitting devices 3 are arranged on a same side of the optical receiving device 2.

Alternatively, directions of the light emitted by the at least two optical emitting devices 3 are deviated toward the center line of the optical receiving device 2.

Alternatively, at least two optical emitting devices 3 and the optical receiving device 2 are arranged in a row.

Alternatively, a detection range of the optical receiving device 2 and the optical emitting device 3 is within 2 cm.

Alternatively, at least two optical emitting devices 3 and the optical receiving device 2 are integrated in one optical module.

Figure 2:
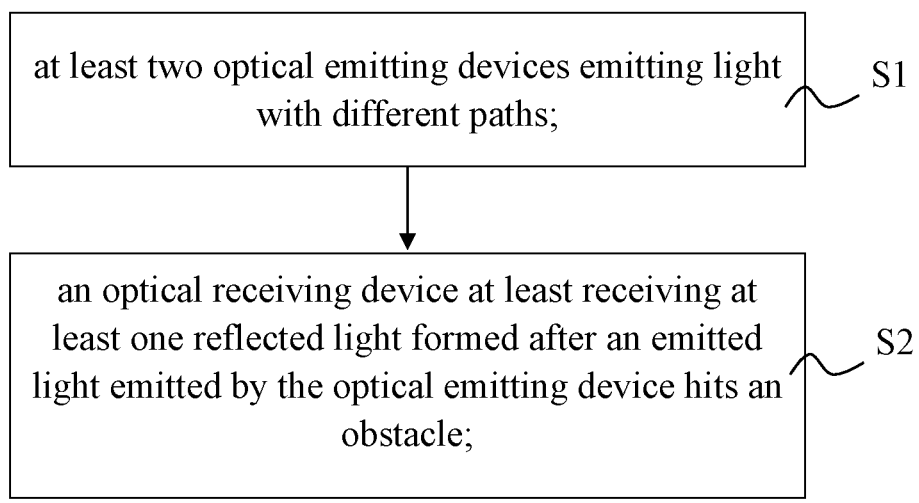
FIG. 2 is a flowchart of a distance measuring method of the self-moving device according to an embodiment of the present application.

Referring to FIG. 2 and in combination with FIG. 1, the distance measuring method of the sweeping robot 10 of the present application includes:
S1: at least two optical emitting devices 3 emitting light with different emission paths; and
S2: an optical receiving device 2 at least receiving a reflected light formed after the emitted light emitted by the at least one optical emitting device 3 hits an obstacle.

Alternatively, the emitted light emitted by each optical emitting device 3 forms an included angle θ with a center line of the optical receiving device 2, and the included angle is greater than 0°. Among two adjacent optical emitting devices 3, the optical emitting device 3 which is farther from the optical receiving device 2 forms a first included angle with the center line of the optical receiving device 2. The optical emitting device 3 which is closer to the optical receiving device forms a second included angle with the center line of the optical receiving device 2. The first included angle is smaller than the second included angle.

In summary, the sweeping robot 10 and the distance measuring method thereof adopts the emitted light that can emit different paths, so that the area of the received emitted light is larger when it is closer to the obstacle. The emitted light is superimposed by specular reflection and diffuse reflection, thereby increasing the received light intensity and reducing the problem of inconsistent feedback distances of obstacles with different reflectivity, so that obstacles with low reflectivity can be effectively detected, and detours to obstacles with low reflectivity can be realized, and the detour distance can be consistent.

Figure 3:
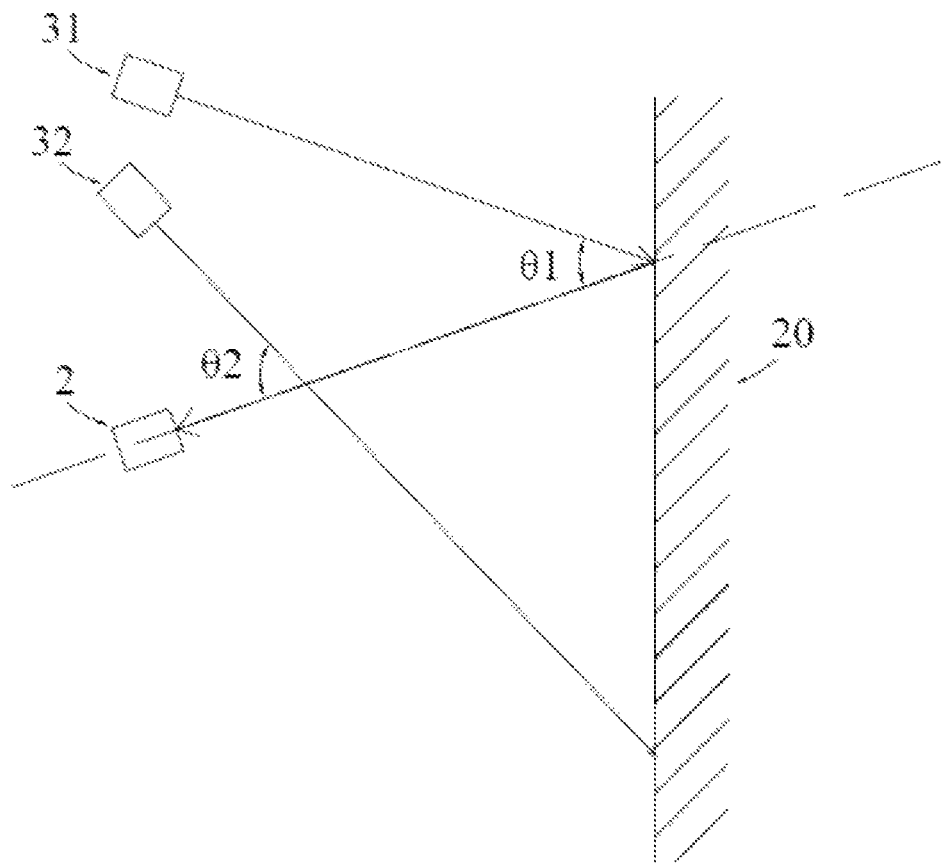
FIG. 3 is a schematic view of reflection when the self-moving device encounters an obstacle according to an embodiment of the present application.

A specific embodiment will be described in detail below. Referring to FIG. 3, in this embodiment, the number of the optical emitting devices 3 is selected to be two, including a first optical emitting device 31 and a second optical emitting device 32. The number of optical receiving device 2 is one. The paths of the emitted light emitted by the first optical emitting device 31 and the second optical emitting device 32 are different, but both are deviated toward the optical receiving device 2. The first optical emitting device 31 and the second optical emitting device 32 are arranged on the same side of the optical receiving device 2. The first optical emitting device 31, the second optical emitting device 32 and the optical receiving device 2 are arranged in a row. The first optical emitting device 31 is disposed farther from the optical receiving device 2 than the second optical emitting device 32. Taking directions of FIG. 1 as an example, a direction of arrow a in FIG. 1 is a left-right direction, and a direction of arrow b is a moving direction of the sweeping robot 10, which is defined as a front-rear direction.

The first optical emitting device 31 and the center line of the optical receiving device 2 form a first included angle θ1 greater than 0°. The second optical emitting device 32 and the center line of the optical receiving device 2 form a second included angle θ2 greater than 0°. The first included angle θ1 is smaller than the second included angle θ2. In addition, in FIG. 1, the center line of the optical receiving device 2 is shown by a dotted line x. In this embodiment, the reflected light received by the optical receiving device 2 is the reflected light formed after the emitted light emitted by the first optical emitting device 31 hits the obstacle. Therefore, in FIG. 1, the center line overlaps the reflection line of the first optical emitting device 31.

The technical features of the above embodiments can be combined arbitrarily. In order to simplify the description, all possible combinations of the technical features in the above embodiments are not described. However, as long as there is no contradiction in the combination of these technical features, they should be considered to be within the scope of the description in this specification.

The above examples only represent several embodiments of the present application, and the descriptions thereof are relatively specific and detailed, but should not be construed as a limitation on the scope of the present invention. It should be noted that, for those skilled in the art, without departing from the concept of the present application, several modifications and improvements can be made, which all belong to the protection scope of the present application. Therefore, the scope of protection of the patent of the present application shall be subject to the appended claims.

What is claimed is:

1. A self-moving device, comprising:
   a body,
   a walking assembly arranged on the body, and
   a control system arranged in the body,
   the self-moving device further comprising an optical receiving device and at least two optical emitting devices arranged on the body, paths of emitted light emitted by the at least two optical emitting devices being different, the optical receiving device being adapted to receive a reflected light formed after the emitted light emitted by at least one of the optical emitting devices hits an obstacle,
   wherein the optical emitting device farther from the optical receiving device in two adjacent optical emitting devices forms a first included angle with a center line of the optical receiving device, the optical emitting device closer to the optical receiving device forms a second included angle with the center line of the optical receiving device, and the first included angle is smaller than the second included angle, and
   wherein the closer the self-moving device is to the obstacle, the larger an area of the emitted light received by the optical receiving device is.

2. The self-moving device according to claim 1, wherein the emitted light emitted by each of the optical emitting devices forms an included angle θ with the center line of the optical receiving device, and the included angle is greater than 0°.

3. The self-moving device according to claim 2, wherein the at least two optical emitting devices are arranged on a same side of the optical receiving device.

4. The self-moving device according to claim 2, wherein directions of the emitted light emitted by the at least two optical emitting devices are deviated toward the center line of the optical receiving device.

5. The self-moving device according to claim 1, wherein the at least two optical emitting devices and the optical receiving device are arranged in a row.

6. The self-moving device according to claim 1, wherein a detection range of the optical receiving device and the optical emitting device is within 2 cm.

7. The self-moving device according to claim 1, wherein the at least two optical emitting devices and the optical receiving device are integrated in one optical module.

8. A distance measuring method of a self-moving device, comprising:
   at least two optical emitting devices emitting light with different paths; and
   an optical receiving device at least receiving at least one reflected light formed after an emitted light emitted by the optical emitting device hits an obstacle,
   wherein the optical emitting device farther from the optical receiving device in two adjacent optical emitting devices forms a first included angle with a center line of the optical receiving device, the optical emitting device closer to the optical receiving device forms a second included angle with the center line of the optical receiving device, and the first included angle is smaller than the second included angle, and
   wherein the closer the self-moving device is to the obstacle, the larger an area of the emitted light received by the optical receiving device is.

9. The distance measuring method of the self-moving device according to claim 8, wherein the emitted light emitted by each of the optical emitting devices forms an included angle θ with the center line of the optical receiving device, and the included angle is greater than 0°.

10. A self-moving device, comprising:
    a body,
    a walking assembly arranged on the body, and
    a control system arranged in the body, a front portion of the body being provided with an optical receiving device and at least two optical emitting devices, the at least two optical emitting devices being arranged side by side, the optical emitting device farther from the optical receiving device forming a first included angle with a center line of the optical receiving device, the optical emitting device closer to the optical receiving device forming a second included angle with the center line of the optical receiving device, the first included angle being smaller than the second included angle, the closer the self-moving device being to an obstacle, the larger an area of the emitted light received by the optical receiving device.

11. The self-moving device according to claim 10, wherein two optical emitting devices are provided; and wherein a reflected light formed after the emitted light emitted by the optical emitting device far from the optical receiving device hits the obstacle overlaps the center line of the optical receiving device.

12. The self-moving device according to claim 10, wherein the at least two optical emitting devices are located on a same side of the optical receiving device, and directions of the emitted light emitted by the at least two optical generating devices are deviated toward the center line of the optical receiving device.

* * * * *